(12) United States Patent
Vadhri et al.

(10) Patent No.: US 11,379,847 B2
(45) Date of Patent: Jul. 5, 2022

(54) METHOD, SYSTEM, AND COMPUTER PROGRAM PRODUCT FOR CONTROLLING TRANSACTION VELOCITY LIMITS

(71) Applicant: Visa International Service Association, San Francisco, CA (US)

(72) Inventors: Srinivas Vadhri, San Ramon, CA (US); Anil Kumar, Austin, TX (US); Sowmya Saiprasad, Union City, CA (US); Kelly Alpert, Kentfield, CA (US)

(73) Assignee: Visa International Service Association, San Francisco, CA (US)

( * ) Notice: Subject to any disclaimer, the term of this patent is extended or adjusted under 35 U.S.C. 154(b) by 13 days.

(21) Appl. No.: 16/618,691

(22) PCT Filed: Jun. 13, 2017

(86) PCT No.: PCT/US2017/037180
§ 371 (c)(1),
(2) Date: Dec. 2, 2019

(87) PCT Pub. No.: WO2018/231199
PCT Pub. Date: Dec. 20, 2018

(65) Prior Publication Data
US 2020/0090178 A1   Mar. 19, 2020

(51) Int. Cl.
*G06Q 20/40* (2012.01)
*G06Q 20/38* (2012.01)

(52) U.S. Cl.
CPC ......... *G06Q 20/405* (2013.01); *G06Q 20/382* (2013.01); *G06Q 20/4016* (2013.01)

(58) Field of Classification Search
None
See application file for complete search history.

(56) References Cited

U.S. PATENT DOCUMENTS 7,104,443 B1    9/2006 Paul et al.
10,825,028 B1 *  11/2020 Kramme ................ G06N 5/046
(Continued)

FOREIGN PATENT DOCUMENTS

EP    2407919 A1    1/2012

OTHER PUBLICATIONS

M. E. Peters, "Emerging ecommerce credit and debit card protocols," Proceedings. Third International Symposium on Electronic Commerce,, 2002, pp. 39-46, doi: 10.1109/ISEC.2002.1166909. (Year: 2002).*

*Primary Examiner* — Gregory S Cunningham, II
(74) *Attorney, Agent, or Firm* — The Webb Law Firm

(57) ABSTRACT

A method of controlling transaction velocity limits including: generating a transaction control criterion associated with a parameter; receiving a transaction message associated with a transaction request; analyzing the data associated with the parameter with respect to the transaction control criterion associated with the parameter; automatically generating and communicating at least one of: a processing request message associated with the transaction request if data associated with the at least one parameter in the transaction message does not satisfy the transaction control criterion associated with the at least one parameter, and a rejection response message if data associated with the at least one parameter in the transaction message does satisfy the transaction control criterion associated with the at least one parameter; and generating update data associated with the parameter. A system and computer program product for controlling transaction velocity limits is also disclosed.

11 Claims, 9 Drawing Sheets

(56) References Cited

U.S. PATENT DOCUMENTS

| | | |
|---|---|---|
| 2003/0208439 A1 | 11/2003 | Rast |
| 2003/0212620 A1 | 11/2003 | Blagg |
| 2012/0330769 A1* | 12/2012 | Arceo .................... G06Q 20/32 455/411 |
| 2013/0110715 A1 | 5/2013 | Buchhop |
| 2013/0198075 A1* | 8/2013 | Sakata ................ G06Q 20/382 705/44 |
| 2014/0358789 A1* | 12/2014 | Boding ................ G06Q 20/405 705/44 |
| 2016/0269908 A1* | 9/2016 | Richards ............... H04L 63/083 |

* cited by examiner

Configure Velocity Limit

Select Transaction Originator   Select BIN

Merchant A
Merchant B
Merchant C
40 — Merchant D      Maximum Transaction Amount Per Day:   Maximum Number of Transactions Per Day:
Merchant E           Enter Amount                          Enter Number
Merchant F
Merchant G
Merchant H
Merchant I
Merchant J Notifications Threshold
[  ] %

Email Address:                     Notification will be sent to:
[           ] Add

FIG. 6A

Configure Velocity Limit ⟵ 39

Select Transaction Originator | Select BIN
[Merchant A ▼] | [123456 / 654321] ⟵ 42

Velocity Control Type: | Maximum Transaction Amount Per Day: | Maximum Number of Transactions Per Day:
☐ Transaction Amount | [USD ▼] [Enter Amount] | [Enter Number]
☐ Transaction Count Notifications ☐ Send notifications when % of Limit is reached
Notifications Threshold
[     ] %

Email Address: | Notification will be sent to:
[         ] [Add] | [         ]

FIG. 6B

Configure Velocity Limit ⤺ 39

Select Transaction Originator: [Merchant A ▼]   Select BIN: [123456 ▼]

Velocity Control Type:
☑ Transaction Amount
☑ Transaction Count

Maximum Transaction Amount Per Day: [USD ▼] [10,000,000]   — 44

Maximum Number of Transactions Per Day: [500,000]   — 46

Notifications

☑ Send notifications when % of Limit is reached

Notifications Threshold
[55] [%]

Email Address:
[_____] [Add]

Notification will be sent to:
[_____]
[Remove]

Enable / Disable

☑ Enable Velocity Limit

[Save]

FIG. 6C

Configure Velocity Limit

Select Transaction Originator: Merchant A
Select BIN: 123456

Velocity Control Type:
☑ Transaction Amount
☑ Transaction Count

Maximum Transaction Amount Per Day: USD 10,000,000
Maximum Number of Transactions Per Day: 500,000

Notifications

☑ Send notifications when % of Limit is reached

Notifications Threshold: 55 %

Email Address: MerchantA@biz.com [Add]

Notification will be sent to: [Remove]

Enable / Disable
☑ Enable Velocity Limit

[Save]

FIG. 6D

METHOD, SYSTEM, AND COMPUTER PROGRAM PRODUCT FOR CONTROLLING TRANSACTION VELOCITY LIMITS

CROSS-REFERENCE TO RELATED APPLICATIONS

This application is the United States national phase of International Application No. PCT/US2017/037180 filed Jun. 13, 2017, the disclosure of which is hereby incorporated by reference in its entirety.

BACKGROUND OF THE INVENTION

Technical Field-of the Disclosure

This disclosure relates to a method, system, and computer program product for controlling transaction velocity limits.

Technical Considerations

In transactions between customers and merchants, merchants can use a merchant application program interface (API) to directly communicate with transaction service providers without any middle level intervention. This allows merchants to initiate processing of transactions directly with transaction service providers without acquirer intervention. Through this arrangement, funds are processed substantially in real time, providing convenience to all parties involved in such transactions.

However, with the increasing risk and sophistication of identity theft and fraud associated with transactions, such an arrangement also financially exposes certain potentially liable parties, such as an acquiring bank (e.g., an acquirer). Thus, because the merchant API directly reaches transaction service providers, acquirers risk significant financial liability in the event that one of their merchants processes fraudulent transactions, as the acquirer does not have the ability to control or monitor the processing of these transactions.

It is possible to increase the chance of identifying and blocking fraudulent activity by monitoring and controlling certain parameters associated with transactions. For example, merchants selling certain categories of goods and/or services know, with some degree of certainty, the range of certain parameters, such as the amount of a typical transaction, the typical summed amount of all transactions conducted over a period of time, and the count of the number of transactions conducted in one day (all of which are examples of velocity controls). Activities that fall outside the ranges of these known, or expected, parameters may indicate fraudulent activity.

Therefore, there is a need in the art to provide acquirers with a way of monitoring and controlling velocity controls for each of their merchants. This allows acquirers to reap the benefits of funds being processed substantially in real time, while mitigating the potential liability and preventing fraudulent activities. There is also a need in the art for acquirers to be capable of monitoring and controlling velocity limits through direct communication with or through transaction service providers, without the need for intervention from any other third party entity.

SUMMARY OF THE DISCLOSURE

Accordingly, and generally, provided is an improved method, system, and computer program product for controlling transaction velocity limits.

According to some non-limiting embodiments or aspects, provided is a method of controlling transaction velocity limits, including: (a) generating, on at least one processor, at least one transaction control criterion associated with at least one parameter; (b) receiving, from at least one requesting processor, a transaction message associated with a transaction request, the transaction message including data associated with the at least one parameter; (c) analyzing, with at least one processor, at least a portion of the data associated with the at least one parameter with respect to the at least one transaction control criterion associated with the at least one parameter; (d) automatically generating and communicating, with at least one processor, at least one of: a processing request message associated with the transaction request if data associated with the at least one parameter in the transaction message does not satisfy the transaction control criterion associated with the at least one parameter; and a rejection response message if data associated with the at least one parameter in the transaction message does satisfy the transaction control criterion associated with the at least one parameter; and (e) generating, with at least one processor, update data associated with the at least one parameter.

In some non-limiting embodiments or aspects, the method may further include repeating steps (b)-(e) for a subsequent transaction message from the at least one requesting processor. The at least one parameter may be associated with a value, and the method may further include incrementing the value in the update data. The incremented value of the at least one parameter may be compared with the at least one transaction control criterion, and based at least partially on the comparison, a notification may be generated and communicated to at least one of the following: the at least one requesting processor, an acquirer system, a merchant system, at least one server, a third-party server, or any combination thereof. The method may include preventing the processing of any further transactions by or through the at least one requesting processor based at least partially on the data associated with the at least one parameter.

In some non-limiting embodiments or aspects, the method may further include receiving, from an acquirer system, the at least one transaction control criterion. At least a portion of the update data may be communicated to the acquirer system.

In some non-limiting embodiments or aspects, the method may further include generating or causing the generation of an interface programmed and/or configured to facilitate control of at least one action associated with at least one of the following: the at least one transaction control criterion, the at least one parameter, the processing request message, the rejection message, update data, notification data, or any combination thereof. The at least one parameter may include at least one of the following: per monetary transaction amount limit, sum of monetary transactions amount limit, transaction count limit, transaction count rate limit, time period limits, card type limit, currency-based limits, terminate/stop switch limit, or any combination thereof.

According to some non-limiting embodiments or aspects, provided is a system for controlling transaction velocity limits, including at least one server computer including at least one processor. The at least one server computer is programmed and/or configured to: (a) generate, on at least one processor, at least one transaction control criterion associated with at least one parameter; (b) receive, from at least one requesting processor, a transaction message associated with a transaction request, the transaction message including data associated with the at least one parameter; (c) analyze, with at least one processor, at least a portion of the data associated with the at least one parameter with respect to the at least one transaction control criterion associated with the at least one parameter; (d) automatically generate and communicate, with at least one processor, at least one of: a processing request message associated with the transaction request if data associated with the at least one parameter in the transaction message does not satisfy the transaction control criterion associated with the at least one parameter; and a rejection response message if data associated with the at least one parameter in the transaction message does satisfy the transaction control criterion associated with the at least one parameter; and (e) generate, with at least one processor, update data associated with the at least one parameter.

In some non-limiting embodiments or aspects, the system may be programmed and/or configured to repeat (b)-(e) for a subsequent transaction message from the at least one requesting processor. The at least one parameter may be associated with a value and the system further programmed and/or configured to increment the value in the update data. The system may be further programmed and/or configured to: compare the incremented value of the at least one parameter with the at least one transaction control criterion; based at least partially on the comparison, generate a notification; and automatically communicate the notification to at least one of the following: the at least one requesting processor, an acquirer system, a merchant system, at least one server, a third-party server, or any combination thereof. The system may be further programmed and/or configured to prevent the processing of any further transactions by or through the at least one requesting processor based at least partially on the data associated with the at least one parameter.

In some non-limiting embodiments or aspects, the system may be further programmed and/or configured to receive, from an acquirer system, the at least one transaction control criterion. The system may be further programmed and/or configured to communicate at least a portion of the update data to the acquirer system.

In some non-limiting embodiments or aspects, the system may be further programmed and/or configured to generate or cause the generation of an interface programmed and/or configured to facilitate control of at least one action associated with at least one of the following: the at least one transaction control criterion, the at least one parameter, the processing request message, the rejection message, update data, notification data, or any combination thereof. The at least one parameter may include at least one of the following: per monetary transaction amount limit, sum of monetary transactions amount limit, transaction count limit, transaction count rate limit, time period limits, card type limit, currency-based limits, terminate/stop switch limit, or any combination thereof.

According to some non-limiting embodiments or aspects, provided is a computer program product for controlling transaction velocity limits, including at least one non-transitory computer-readable medium including program instructions that, when executed by at least one processor, cause the at least one processor to: (a) generate at least one transaction control criterion associated with at least one parameter; (b) receive a transaction message associated with a transaction request, the transaction message including data associated with the at least one parameter; (c) analyze at least a portion of the data associated with the at least one parameter with respect to the at least one transaction control criterion associated with the at least one parameter; (d) automatically generate and communicate at least one of: a processing request message associated with the transaction request if data associated with the at least one parameter in the transaction message does not satisfy the transaction control criterion associated with the at least one parameter; and a rejection response message if data associated with the at least one parameter in the transaction message does satisfy the transaction control criterion associated with the at least one parameter; and (e) generate update data associated with the at least one parameter.

In some non-limiting embodiments or aspects, the computer program product may include an acquirer system automatically communicating at least one transaction control criterion to the at least one processor.

Further non-limiting embodiments or aspects are set forth in the following numbered clauses:

Clause 1: A method of controlling transaction velocity limits, comprising: (a) generating, on at least one processor, at least one transaction control criterion associated with at least one parameter; (b) receiving, from at least one requesting processor, a transaction message associated with a transaction request, the transaction message comprising data associated with the at least one parameter; (c) analyzing, with at least one processor, at least a portion of the data associated with the at least one parameter with respect to the at least one transaction control criterion associated with the at least one parameter; (d) automatically generating and communicating, with at least one processor, at least one of: a processing request message associated with the transaction request if data associated with the at least one parameter in the transaction message does not satisfy the transaction control criterion associated with the at least one parameter and a rejection response message if data associated with the at least one parameter in the transaction message does satisfy the transaction control criterion associated with the at least one parameter; and (e) generating, with at least one processor, update data associated with the at least one parameter.

Clause 2: The method of clause 1, further comprising repeating steps (b)-(e) for a subsequent transaction message from the at least one requesting processor.

Clause 3: The method of clause 1 or 2, wherein the at least one parameter is associated with a value, the method further comprising incrementing the value in the update data.

Clause 4: The method of any of clauses 1-3, further comprising: comparing the incremented value of the at least one parameter with the at least one transaction control criterion; based at least partially on the comparison, generating a notification; and automatically communicating the notification to at least one of the following: the at least one requesting processor, an acquirer system, a merchant system, at least one server, a third-party server, or any combination thereof.

Clause 5: The method of any of clauses 1-4, further comprising preventing the processing of any further transactions by or through the at least one requesting processor based at least partially on the data associated with the at least one parameter.

Clause 6: The method of any of clauses 1-5, further comprising receiving, from an acquirer system, the at least one transaction control criterion.

Clause 7: The method of any of clauses 1-6, wherein the at least a portion of the update data is communicated to the acquirer system.

Clause 8: The method of any of clauses 1-7, further comprising generating or causing the generation of an interface programmed and/or configured to facilitate control of at least one action associated with at least one of the following: the at least one transaction control criterion, the at least one parameter, the processing request message, the rejection message, update data, notification data, or any combination thereof.

Clause 9: The method of any of clauses 1-8, wherein the at least one parameter comprises at least one of the following: per monetary transaction amount limit, sum of monetary transactions amount limit, transaction count limit, transaction count rate limit, time period limits, card type limit, currency-based limits, terminate/stop switch limit, or any combination thereof.

Clause 10: A system for controlling transaction velocity limits, comprising at least one server computer including at least one processor, the at least one server computer programmed and/or configured to: (a) generate, on at least one processor, at least one transaction control criterion associated with at least one parameter; (b) receive, from at least one requesting processor, a transaction message associated with a transaction request, the transaction message comprising data associated with the at least one parameter; (c) analyze, with at least one processor, at least a portion of the data associated with the at least one parameter with respect to the at least one transaction control criterion associated with the at least one parameter; (d) automatically generate and communicate, with at least one processor, at least one of: a processing request message associated with the transaction request if data associated with the at least one parameter in the transaction message does not satisfy the transaction control criterion associated with the at least one parameter; and a rejection response message if data associated with the at least one parameter in the transaction message does satisfy the transaction control criterion associated with the at least one parameter; and (e) generate, with at least one processor, update data associated with the at least one parameter.

Clause 11: The system of clause 10, programmed and/or configured to repeat (b)-(e) for a subsequent transaction message from the at least one requesting processor.

Clause 12: The system of clause 10 or 11, wherein the at least one parameter is associated with a value, the system further programmed and/or configured to increment the value in the update data.

Clause 13: The system of any of clauses 10-12, further programmed and/or configured to: compare the incremented value of the at least one parameter with the at least one transaction control criterion; based at least partially on the comparison, generate a notification; and automatically communicate the notification to at least one of the following: the at least one requesting processor, an acquirer system, a merchant system, at least one server, a third-party server, or any combination thereof.

Clause 14: The system of any of clauses 10-13, further programmed and/or configured to prevent the processing of any further transactions by or through the at least one requesting processor based at least partially on the data associated with the at least one parameter.

Clause 15: The system of any of clauses 10-14, further programmed and/or configured to receive, from an acquirer system, the at least one transaction control criterion.

Clause 16: The system of any of clauses 10-15, further programmed and/or configured to communicate at least a portion of the update data to the acquirer system.

Clause 17: The system of any of clauses 10-16, further programmed and/or configured to generate or cause the generation of an interface programmed and/or configured to facilitate control of at least one action associated with at least one of the following: the at least one transaction control criterion, the at least one parameter, the processing request message, the rejection message, update data, notification data, or any combination thereof.

Clause 18: The system of any of clauses 10-17, wherein the at least one parameter comprises at least one of the following: per monetary transaction amount limit sum of monetary transactions amount limit, transaction count limit, transaction count rate limit, time period limits, card type limit, currency-based limits, terminate/stop switch limit, or any combination thereof.

Clause 19: A computer program product for controlling transaction velocity limits, comprising at least one non-transitory computer-readable medium including program instructions that, when executed by at least one processor, cause the at least one processor to: (a) generate at least one transaction control criterion associated with at least one parameter; (b) receive a transaction message associated with a transaction request, the transaction message comprising data associated with the at least one parameter; (c) analyze at least a portion of the data associated with the at least one parameter with respect to the at least one transaction control criterion associated with the at least one parameter; (d) automatically generate and communicate at least one of: a processing request message associated with the transaction request if data associated with the at least one parameter in the transaction message does not satisfy the transaction control criterion associated with the at least one parameter; and a rejection response message if data associated with the at least one parameter in the transaction message does satisfy the transaction control criterion associated with the at least one parameter; and (e) generate update data associated with the at least one parameter.

Clause 20: The computer program product of clause 19, wherein an acquirer system automatically communicates at least one transaction control criterion to the at least one processor.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which:

FIG. 6A shows a view of a non-limiting embodiment or aspect of an interface by which an acquirer server may set and communicate a transaction control criterion according to principles of the present disclosure;

FIG. 6B shows a view of non-limiting embodiment or aspect of the interface of FIG. 6A by which the acquirer server may set and communicate the transaction control criterion according to principles of the present disclosure;

FIG. 6C shows a view of a non-limiting embodiment or aspect of the interface of FIG. 6A by which the acquirer server may set and communicate the transaction control criterion according to principles of the present disclosure; and FIG. 6D shows a view of non-limiting embodiment or aspect of the interface of FIG. 6A by which the acquirer server may set and communicate the transaction control criterion according to principles of the present disclosure;

DESCRIPTION OF THE DISCLOSURE

Figure 1:
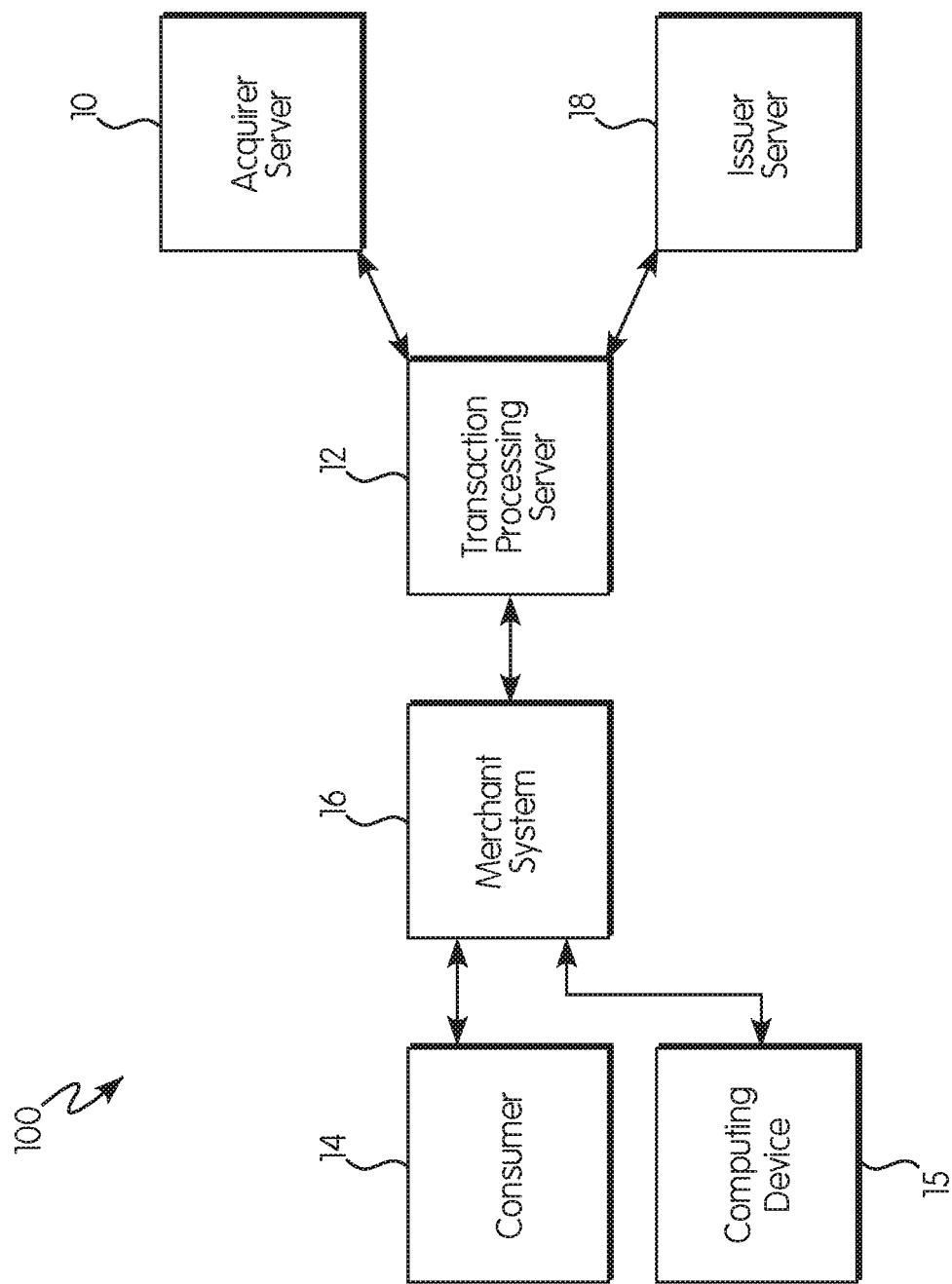
FIG. 1 is a schematic view of a non-limiting embodiment or aspect of a system for controlling transaction velocity limits according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the terms "issuing institution," "portable financial device issuer," "issuer," or "issuer bank" may refer to one or more entities that provide accounts to customers for conducting payment transactions, such as initiating credit and/or debit payments. For example, an issuing institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases, such that they may be used to conduct a transaction without directly using the original account identifier. In some examples, an original account identifier, such as a PAN, may be associated with a plurality of tokens for different individuals or purposes. An issuing institution may be associated with a bank identification number (BIN) that uniquely identifies it. The terms "issuer" and "issuer server" may also refer to one or more computer systems operated by or on behalf of an issuing institution, such as a server computer executing one or more software applications. For example, an issuer system may include one or more authorization servers for authorizing or effecting a payment transaction.

As used herein, the term "merchant" refers to an individual or entity that provides goods and/or services, or access to goods and/or services, to customers (also referred to herein as a "consumer") based on a transaction, such as a payment transaction. "Merchant" or "merchant server" may also refer to one or more computer systems operated by or on behalf of a merchant, such as a server computer executing one or more software applications. As used herein, a "merchant system" may refer to one or more computers and/or peripheral devices used by a merchant to engage in or facilitate payment transactions with customers, including one or more point-of-sale (POS) devices, one or more card readers, near-field communication (NFC) receivers, RFID receivers, and/or other contactless transceivers or receivers, contact-based receivers, payment terminals, computers, servers, input devices, and/or other like devices that may be used to initiate, facilitate, or process a payment transaction. A merchant system may also include one or more server computers programmed and/or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer. The term "transaction service provider" may also refer to one or more computer systems operated by or on behalf of a transaction service provider, such as a server computer executing one or more software applications ("transaction processing server", e.g., VisaNet). The term "transaction processing server" (or system), may include one or more computers, processors, storage devices, network interfaces, and executable instructions or code in the form of applications, APIs, software, firmware, code modules and the like operating in a network environment. When a user engages or initiates a transaction with a merchant at a point-of-sale, he or she will interact with a point-of-sale system, e.g., using a credit card, portable financial device, payment device, and/ or mobile device to interact either directly or indirectly with a reader device communicating as or within the point-of-sale system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "originator" may refer to an entity that offers OCT, AFT, multi-OCT, multi-AFT, or some combination thereof services to its consumers. The originator may be a merchant, as defined above. In addition to being a merchant, the originator may or may not also be an acquirer of the transaction service provider. If the originator is not also an acquirer associated with the transaction service provider, the originator may be sponsored by an acquirer associated with the transaction service provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant, a pager, a security card, a computer, an access card, a wireless terminal, and/or a transponder, as examples. The portable financial device may include a volatile or a non-volatile memory to store information, such as an account identifier or a name of the account holder. As used herein, the information or data associated with the "portable financial device" may be used to conduct electronic or online transactions with one or more merchants, such as through on online location of the merchant.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "payment facilitator" may refer to a payment processing system operated by or on behalf of an entity that contracts with an acquirer to provide transaction service provider payment services using portable financial devices of the transaction service provider to merchants sponsored by the payment facilitator. A payment facilitator may also refer to the entity that operates such a payment processing system. The payment facilitator may execute a merchant acceptance agreement on behalf of an acquirer and/or receive settlement of transaction proceeds from an acquirer on behalf of a sponsored merchant. The payment facilitator may monitor all of its sponsored merchant activity in accordance with regulations of the transaction service provider.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant system.

Non-limiting embodiments or aspects of the present disclosure are directed to a method, system, and computer program product for controlling transaction velocity limits. Non-limiting embodiments or aspects of the method, system, and computer product according to the present disclosure provide acquirers with a process to configure, monitor, and/or control transactional velocity parameters for each of their merchants. Non-limiting embodiments or aspects of the method, system, and computer product according to the present disclosure also allow acquirers to mitigate their liability and prevent fraudulent activities, while still allowing funds to be processed substantially in real time. Non-limiting embodiments or aspects of the method, system, and computer product according to the present disclosure allow an acquirer server to communicate directly with a transaction processing server to automatically monitor and control velocity limits, parameters, and/or controls without the need for intervention from any other third party entity.

Referring to FIG. 1, a non-limiting embodiment or aspect of a system 100 for controlling transaction velocity limits is shown. In some non-limiting embodiments or aspects, an acquirer server 10, owned by or on behalf of an acquirer, may set at least one transaction control criterion (hereinafter "TCC") associated with at least one parameter by communicating the TCC (or associated information or data) to a transaction processing server 12. The transaction processing server 12 may include at least one processor to process transaction requests from a merchant system 16 and to communicate transaction requests to an issuer server 18, and this processor may be one or separate processors. After the TCC is set and communicated by the acquirer server 10, the transaction processing server 12 may generate the TCC so that the TCC set by the acquirer server 10 is in effect to monitor and control velocity limits corresponding to transactions conducted between a consumer 14 and/or a computing device 15 of the consumer 14 and a merchant/originator (hereinafter "merchant" or "merchant system") related to or operating the merchant system 16. As indicated, the merchant may be associated with the acquirer. In some non-limiting embodiments or aspects, the transaction may be initiated between the consumer 14 and the merchant system 16 by the consumer 14 presenting a portable financial device to the merchant system 16 at a brick-and-mortar location. In non-limiting embodiments or aspects, the transaction may be initiated between the computing device 15 of the consumer 14 and the merchant system 16, such as a purchase by the consumer 14 using a desktop computer, laptop computer, tablet computer, smartphone, or other computing device to make a purchase electronically, such as via the merchant's online website or mobile application.

The TCC may be associated with at least one parameter associated with transactions. The TCC may be a condition associated with the parameter that is imposed by the acquirer server 10 and used to determine whether the transaction between the consumer 14 and/or computing device 15 and the merchant system 16 associated with the acquirer may be permitted to proceed (further processed). In some non-limiting embodiments or aspects, the parameter is associated with a value, such as a numeric value, capable of being incremented. In non-limiting embodiment or aspects, the parameter is not associated with a value, but instead associated with a category, type, outcome, decision, and/or the like. Non-limiting embodiments or aspects of parameters upon which the TCC may be associated include one or more of the following: time period limit (e.g., daily limits), per monetary transaction (e.g., peer-to-peer transfer, fund disbursement, and the like) amount limit, sum of monetary transactions amount limit, transaction count limit (e.g., daily or monthly limit of transaction count), transaction count rate limit (e.g., limit of transaction count over shorter time period, such as count limit over the course of seconds, minutes, or hours to detect possible fraudulent activity), card type limit (e.g., limit to consumer debit only or commercial credit only), currency-based limit (e.g., limit on the type of currency accepted (e.g., US dollars or British pounds only), limit on the amount of each type of currency accepted (e.g., only 1,000,000 Japanese Yen accepted per day or per transaction), or a limit on type of currency or amount of type of currency going to recipient's portable financial device), terminate/stop switch limit, and/or any combination thereof.

In some non-limiting embodiments or aspects, the TCC may be imposed on or assigned to a single transaction. For example, the TCC may require that each transaction between the consumer 14 and/or the computing device 15 and the merchant system 16 be: under a certain monetary amount, conducted using certain card types, conducted using a certain type of currency (e.g., USD, Chinese Yuan, and Japanese Yen only), conducted when a "terminate/stop switch" limit is not in effect, and the like. The "terminate/stop switch" may be a limit that, when set by the acquirer server 10, prevents any additional transactions from the merchant system 16 being further processed until the "terminate/stop switch" limit is removed. In some non-limiting embodiments or aspects, the TCC may be imposed over a period of time. Any period of time may be used; however, some non-limiting periods of time include increments of: hours, days, weeks, months, years, and the like. For example, the TCC may be imposed over a single day. According to this example, the TCC may require: the sum of monetary transactions be under a predetermined amount that day, the count of all transactions conducted that day be under a certain number, all transactions during that day be conducted using certain card types, all transaction during that day be conducted using a certain type of currency, the sum of monetary transactions transactions of a certain type of currency be under a certain amount that day, all transactions during that day be conducted when a terminate/stop switch limit is not in effect, and the like. In some non-limiting embodiments or aspects, the value-based parameter associated with the TCC may need to be incremented to determine whether the TCC for the period of time has been reached (e.g., sum the amount of all monetary transactions during the predetermined period of time to determine if the TCC has been satisfied yet). It will be appreciated that these examples of the TCC (and the parameters associated with the TCC) are not limiting, and the acquirer server 10 may impose TCCs based on any suitable parameter or combination of parameters associated with transactions.

The acquirer server 10 may be programmed and/or configured to change the TCC as needed. In some non-limiting embodiments or aspects, the acquirer server 10 may set a TCC and leave that TCC unchanged indefinitely. In some non-limiting embodiments or aspects, the acquirer server 10 may change the TCC after a predetermined time based at least partially on historical data. For instance, the acquirer server 10 may change the TCC based on factors that are known to alter the volume of transactions handled by the merchant system 16. Some non-limiting examples of factors that may change the volume of transactions handled by the merchant system 16 may include: the hour of the day, the day of the week, the location, the season, the specific time of year, an upcoming holiday, an upcoming event, an annual sale, a non-annual sale, weather, cultural trends, business expansion, and the like. The acquirer server 10 may change the TCC based on an unexpected volume of non-fraudulent activity being handled by the merchant system 16 over the period of time thus far. For example, the TCC may increase or decrease the daily transaction count maximum for the merchant system 16 midday based on how many apparently non-fraudulent transactions have thus far been handled by the merchant system 16. A change to the TCC may be effective immediately upon implementing the modified TCC, such that any subsequent transaction message will be assessed with respect to the modified TCC.

The acquirer server 10 may set the TCC based on historical data with respect to the merchant system's 16 activity. For example, the acquirer server 10 may analyze data that indicates a range for each parameter in which the merchant system 16 operates for each period of time. The acquirer server 10 may set the TCC such that the TCC reflects this expected range in order to limit the potential liability of the acquirer and/or the merchant in the case of fraudulent activity, and the TCC may then be adjusted as necessary.

With continued reference to FIG. 1, the transaction processing server 12 may receive at least one transaction message from a requesting processor of the merchant system 16, the transaction message being associated with a transaction request. The transaction message may be a request for approval of a transaction between the consumer 14 and/or computing device 15 and the merchant system 16. The transaction message may include data associated with the previously-described parameters.

With continued reference to FIG. 1, the transaction processing server 12 may analyze at least a portion of the data associated with the parameter in the transaction message with respect to the TCC associated with that parameter. In some non-limiting embodiments or aspects, the transaction service provider 12 may compare the portion of the data in the transaction message associated with the parameter to the TCC associated with that parameter to determine if the TCC has been satisfied. In some examples (e.g., where the TCC associated with a parameter is value-based over a period of time), the transaction processing server 12 may increment the parameter based on past transaction messages over the period of time in order to determine whether the TCC has been satisfied (e.g., compare the incremented parameter data with the TCC). It should also be recognized that one TCC may be adjusted based upon incoming data associated with another TCC, where the TCCs are interrelated or associated from a data context.

With continued reference to FIG. 1, the transaction processing server 12 may generate and communicate a message based on the analysis of the transaction message with respect to the TCC. If the parameter of the transaction message does not satisfy the TCC, the transaction processing server 12 may generate a processing request message associated with the transaction request, and this processing request message may be communicated to an issuer server 18. Based on this processing request message, the issuer server 18 (owned by or operated on behalf of an issuer) may further process the transaction. The transaction processing server 12 may communicate a message to the merchant system 16 to indicate that the transaction associated with the transaction message is approved. The transaction processing server 12 may communicate a message to the acquirer server 10 to indicate that the transaction associated with the transaction message is approved. The transaction processing server 12 may also generate update data associated with the at least one parameter. The update data may include data that allows the merchant system 16, the acquirer server 10, and/or the transaction processing server 12 to monitor the parameter(s) associated with the TCC. The update data may consider each of the transaction messages communicated to the transaction processing server 12 from the merchant system 16. The transaction processing server 12 may increment the value-based parameter, if applicable, to determine the update data. The transaction processing server 12 may generate and communicate an update message (e.g., a notification) to the acquirer server 10 and/or the merchant system 16 that includes at least a portion of the update data. The update message may include the sum of the value-based parameter used thus far over the period of time to indicate how close the TCC is to being satisfied. The update message may convey, such as in the form of a percentage, how close the parameter is to satisfying the TCC. For example, if the parameter is a maximum transaction count of 100 for the merchant system 16 over the period of one day, and the most recent transaction count for the merchant system 16 was just incremented to 50 (based on the most recent transaction message), the update message communicated to the acquirer server 10 and/or the merchant system 16 may include that 50 transactions have been performed that day and the TCC is 50% satisfied. In some non-limiting embodiments or aspects, an update message may not be communicated to the acquirer server 10 and/or the merchant system 16 after every transaction message, but only after a certain threshold is hit (e.g., the TCC being at least 50% satisfied). It will be appreciated that a notification corresponding to the analysis of the parameter of the transaction message with respect to the TCC may be communicated to any entity, including, but not limited to: the requesting processor of the merchant system 16, the acquirer server 10, a server, a third-party server, or any combination thereof.

If the parameter of the transaction message does satisfy the TCC, the transaction processing server 12 may generate a rejection message associated with the transaction request, and this rejection message may be communicated to the merchant system 16. This rejection message may indicate to the merchant system 16 that the transaction associated with the transaction message is blocked and/or that the TCC has been satisfied. The term "block", as used herein, may mean that the transaction (e.g., the present transaction and/or all future transactions) being communicated by the requesting processor (e.g., of the merchant system 16) to the transaction processing server 12 is prevented from being further processed within the system. The transaction processing server 12 may also generate and communicate a message to the acquirer server 10 to notify the acquirer server 10 that the transaction of the merchant system 16 has been blocked, and that the TCC has been satisfied. It will be appreciated that a notification corresponding to the analysis of the parameter of the transaction message with respect to the TCC may be communicated to any entity, including, but not limited to: the requesting processor of the merchant system 16, the acquirer server, a server, a third-party server, or any combination thereof. Referring to FIG. 1, it will be appreciated that subsequent transaction messages from the merchant system 16 (e.g., a requesting processor thereof) to the transaction processing server 12 may also be processed as described above.

Figure 2:
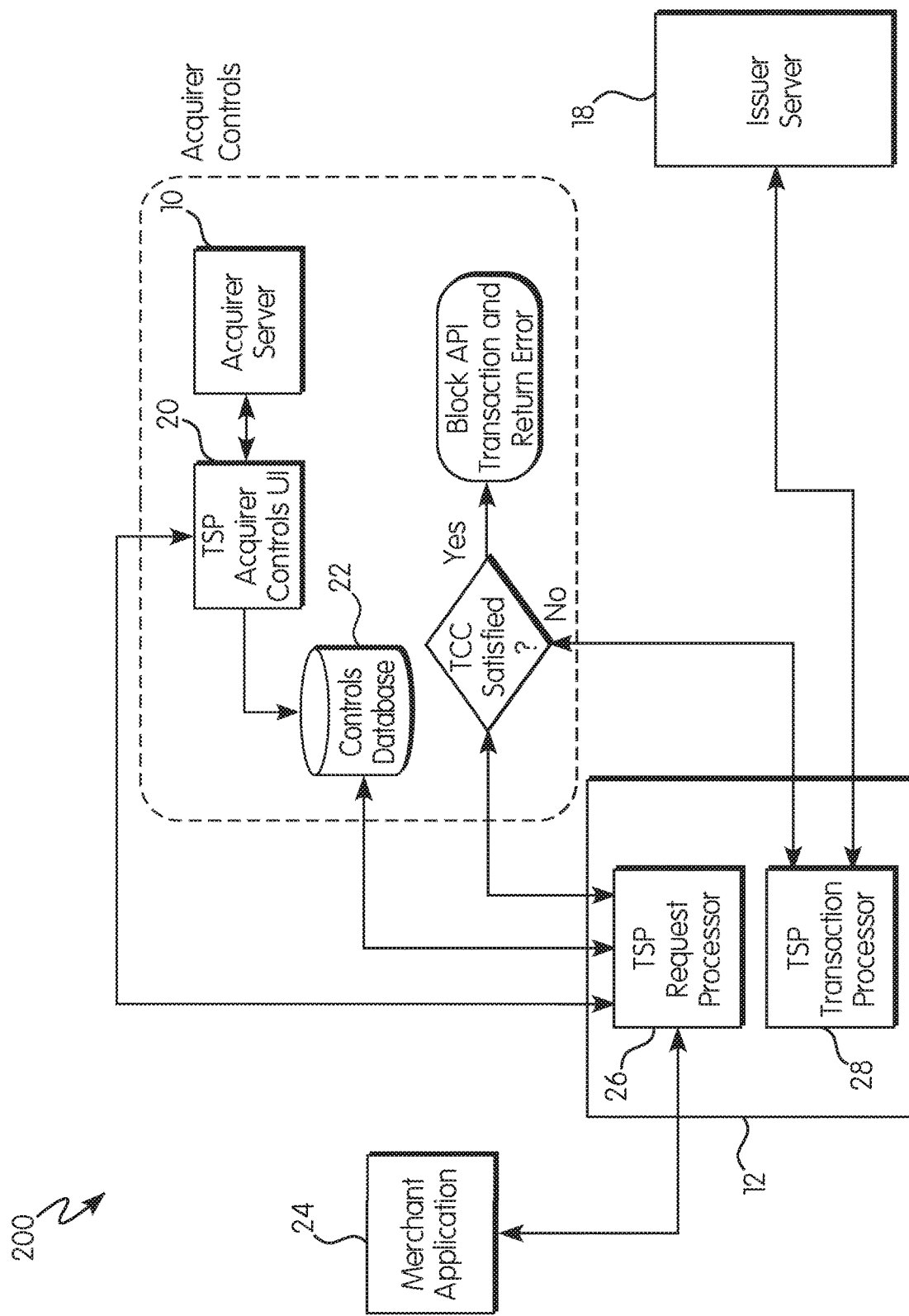
FIG. 2 is a schematic view of a non-limiting embodiment or aspect of another system of controlling transaction velocity limits according to principles of the present disclosure.

Referring to FIG. 2, a non-limiting embodiment or aspect of a system 200 for controlling transaction velocity limits is shown. In this non-limiting embodiment or aspect, the acquirer server 10 may configure, set, and/or communicate acquirer controls (e.g., the TCC) to the transaction processing server 12. The transaction processing server 12 may then generate the TCC based on the settings from the acquirer server 10. The acquirer server 10 may set the TCC using a transaction service provider acquirer controls user interface 20 (hereinafter "UI"). The UI 20 may be generated or caused to be generated by the transaction processing server 12 and may be an interface programmed and/or configured to facilitate control of at least one action associated with at least one of the following: the at least one TCC, the at least one parameter, a processing request message, a rejection message, update data, notification data, or any combination thereof. The UI 20 may be a website and/or a website portal managed by or on behalf of the transaction service provider. The transaction service provider may manage the UI 20 or the UI 20 may be managed on behalf of the transaction service provider. The UI 20 provides an interface in which the acquirer server 10 may set and/or monitor the TCC for each of its merchant systems 16. The UI 20 may include each of the parameters associated with the TCC such that the TCC can be set based on any of those parameters. The UI 20 may receive update data and/or update messages regarding the parameters associated with the TCC, which may allow the acquirer server 10 to dynamically monitor the parameters. In some non-limiting embodiments or aspects, the UI 20 is a website and/or website portal accessible to the acquirer server 10 via an acquirer account on the website and/or web portal, the website or web portal accessible on a website managed by or on behalf of the transaction service provider.

With continued reference to FIG. 2, the UI 20 may be used by the acquirer server 10 to configure or set TCCs for any number of merchant systems associated with the acquirer. The acquirer server 10 may set different TCCs for each of its merchant systems, as suitable for each merchant system. The TCCs may be set by merchant systems and/or by bank identification numbers (BIN) numbers associated with those merchant systems. With continued reference to FIG. 2, the acquirer server 10 may configure or set the TCC using the UI 20, and this TCC may be communicated to a controls database 22 for storage. The controls database 22 may store historical TCCs, the presently-enforced TCC, and/or TCCs to be implemented at a future, predetermined time. The TCC may also store or constitute data associated with the parameters and/or update data corresponding to the parameters. The controls database 22 may be owned and/or managed by or on behalf of the transaction service provider and may be in communication with the transaction processing server 12.

With continued reference to FIG. 2, a merchant application 24 may be in communication with a transaction service provider request processor 26 (of the transaction processing server 12). The transaction service provider request processor 26 may be a representational state transfer (REST) API. The merchant application 24 may be an application owned, managed, and/or designed by or on behalf of the merchant. The merchant application 24 may be associated with a requesting processor of the merchant system 16. The transaction service provider request processor 26 may be owned and/or managed by or on behalf of the transaction service provider, and the merchant application 24 may be any suitable application by which the merchant system 16 may communicate with the transaction service provider request processor 26. In some non-limiting embodiments or aspects, the merchant application 24 is a website that may communicate with the transaction service provider request processor 26, and, in some non-limiting embodiments or aspects, the merchant application 24 is a mobile application that may communicate with the transaction service provider request processor 26. In some non-limiting embodiments or aspects, the merchant application 24 is a smartphone application of the merchant. The merchant application 24 may communicate with the transaction service provider request processor 26 by making an API call to the transaction service provider request processor 26. The merchant application 24 may communicate transaction messages corresponding to transactions conducted by the consumer 14 and/or computing device 15 and the merchant system 16. The transaction may be a monetary, such as an original credit transaction (OCT) or an account funding transaction (AFT), multi-OCT, multi-AFT, or some combination thereof.

With continued reference to FIG. 2, the transaction service provider request processor 26 may receive the transaction messages including the parameter associated with the TCC from the merchant application 24. The transaction service provider request processor 26 may translate the transaction message into any suitable form, which may include incrementing the parameter from the transaction message based on previously-received transaction messages or associated data. This may include converting the currency amount in the transaction message to the standard currency amount used for comparisons (e.g., translating a transaction message including an amount in Canadian dollars to an amount in US dollars). Any other translation of the transaction message (and data therein) may be performed by the transaction service provider request processor 26 to streamline downline processing by the transaction (as described below).

With continued reference to FIG. 2, the transaction service provider request processor 26 may communicate with the controls database 22 to receive data from the controls database 22 corresponding to the TCC and the parameters associated with the TCC. The transaction service provider request processor 26 may also communicate data to the controls database 22 for storage. The data received by the transaction service provider request processor 26 from the controls database 22 may be used by the transaction service provider request processor 26 to determine whether the transaction message received by the transaction service provider request processor 26 from the merchant application 24 should be approved or blocked. In some non-limiting embodiments or aspects, the transaction service provider request processor 26 may analyze the parameter (or incremented parameter) from the transaction message with respect to the TCC (e.g., comparing the parameter or the incremented parameter with the TCC).

With continued reference to FIG. 2, the transaction service provider request processor 26 may analyze the parameter from the transaction message received from the mobile application 24 with respect to the TCC received from the controls database 22. If the transaction service provider request processor 26 determines that the TCC is not satisfied, the transaction service provider request processor 26 may communicate with a transaction service provider transaction processor 28 (of the transaction processing server 12). The transaction service provider transaction processor 28 may be a separate processor or may be the same as the transaction service provider request processor 26. The transaction service provider transaction processor 28 may generate a processing request message to be communicated to the issuer server 18. Based on this processing request message, the issuer server 18 may further process the transaction. The transaction service provider request processor 26 may communicate a message to the merchant application 24 to indicate to the merchant system 16 that the transaction associated with the transaction message is approved. The transaction service provider request processor 26 may communicate with the controls database 22 to store information corresponding to the approved transaction message. The transaction service provider request processor 26 may communicate a message to the acquirer server 10 via the UI 20 to indicate that the transaction associated with the transaction message is approved.

The transaction service provider request processor 26 may also generate the update data associated with the at least one parameter. The transaction service provider request processor 26 may generate and communicate an update message (e.g., a notification) to the acquirer server 10 via the UI 20 or the merchant system 16 via the merchant application 24 that includes at least a portion of the update data. It will be appreciated that a notification corresponding to the analysis of the parameter of the transaction message with respect to the TCC may be communicated by the transaction service provider request processor 26 to any entity, including, but not limited to: the requesting processor of the merchant system 16, the acquirer server 10, a third-party server, or any combination thereof.

If the transaction service provider request processor 26 determines that the TCC is satisfied, the transaction service provider request processor 26 may generate a rejection message associated with the transaction request, and this rejection message may be communicated to the merchant application 24. This rejection message may indicate to the merchant system 16 that the transaction associated with the transaction message is blocked and/or that the TCC has been satisfied. The transaction service provider request processor 26 may also generate and communicate a message to the acquirer server 10 via the UI 20 to notify the acquirer server 10 that the transaction of the merchant system 16 was blocked and that the TCC has been satisfied. It will be appreciated that a notification corresponding to the analysis of the parameter of the transaction message with respect to the TCC may be communicated by the transaction service provider request processor 26 to any entity, including, but not limited to: the requesting processor of the merchant system 16, the acquirer server 10, a server, a third-party server, or any combination thereof.

Figure 3:
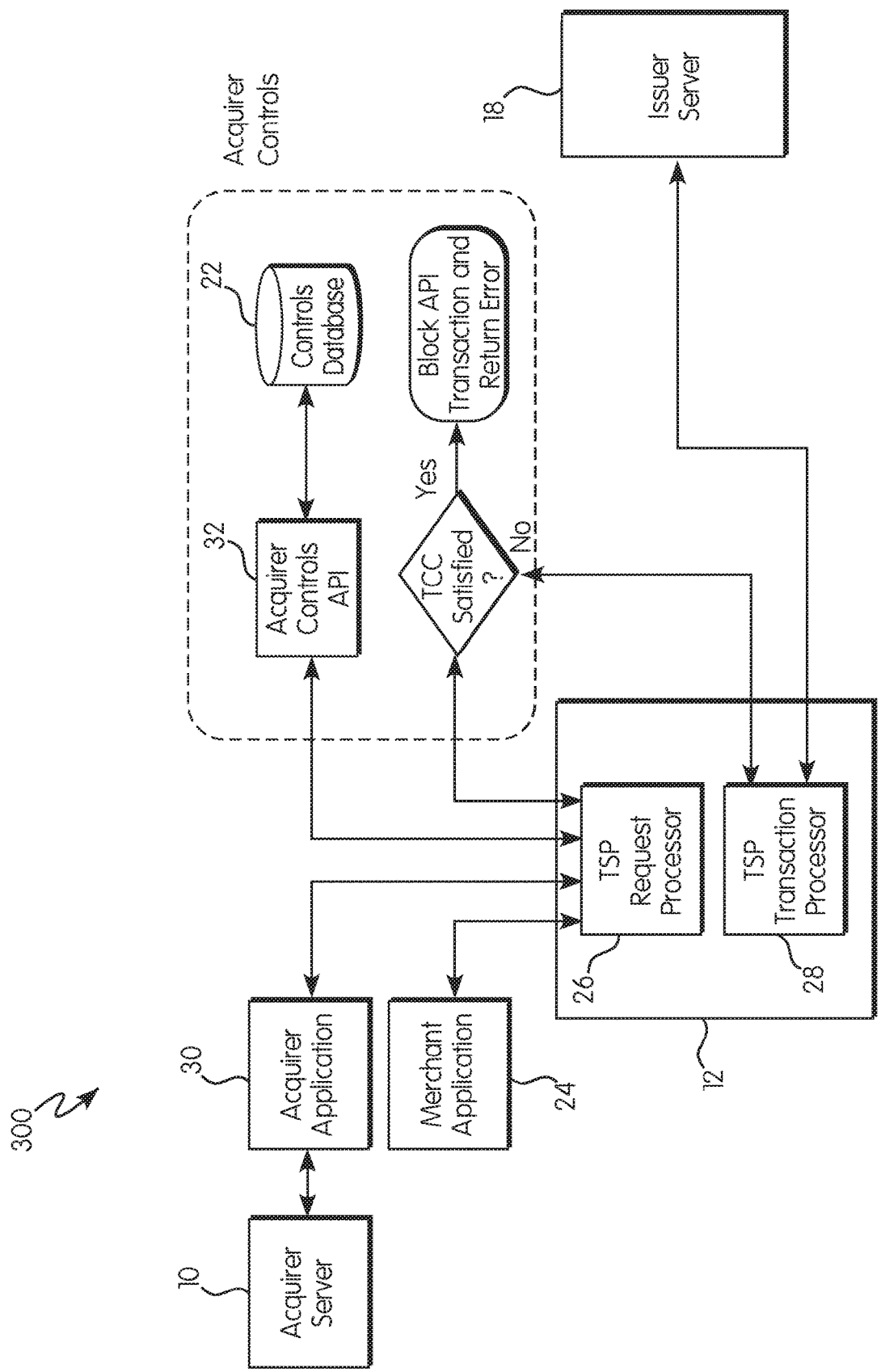
FIG. 3 is a schematic view of a non-limiting embodiment or aspect of another system of controlling transaction velocity limits according to principles of the present disclosure.

Referring to FIG. 3, a non-limiting embodiment or aspect of a system 300 for controlling transaction velocity limits is shown. The components of the system 300 in FIG. 3 include all of the capabilities, functionality, and characteristics of the components from the system 200 of FIG. 2 having like reference numbers. In this non-limiting embodiment or aspect, the acquirer server 10 may set and communicate acquirer controls (e.g., the TCCs) to the transaction processing server 12. The transaction processing server 12 may then generate the TCC based on the settings from the acquirer server 10. The acquirer server 10 may set the TCC using an acquirer application 30. The acquirer application 30 may be generated or caused to be generated by the transaction processing server 12 and may be an interface programmed and/or configured to facilitate control of at least one action associated with at least one of the following: the at least one TCC, the at least one parameter, a processing request message, a rejection message, update data, notification data, or any combination thereof. The acquirer application 30 may be an application owned, managed, and/or designed by or on behalf of the acquirer. The acquirer application 30 may be associated with the acquirer server 10, and the acquirer application 30 may be any suitable interface by which the acquirer server 10 may communicate with the transaction service provider request processor 26. In some non-limiting embodiments or aspects, the acquirer application 30 is a smartphone application associated with the acquirer server 10. The acquirer application 30 may communicate with the transaction service provider request processor 26 by making an API call to the transaction service provider request processor 26, and the acquirer application 30 may be used by the acquirer server 10 to set TCCs for any number of the merchant systems 16 for which it controls or manages. The acquirer server 10 may set different TCCs for each of the merchant systems 16 it controls, as suitable for each merchant system 16. The TCCs may be set by merchant systems and/or by bank identification numbers (BIN) numbers associated with those merchant systems. The acquirer application 30 may also be used by the acquirer server 10 to monitor the parameters associated with the TCC and/or make an API call to the transaction processing server 12 to receive the update data regarding any parameter so that the acquirer server 10 can dynamically monitor the data associated with each of the merchant systems it controls. It will be appreciated that the acquirer may develop its acquirer application 30 in any suitable way to so that the acquirer server 10 may monitor and control the parameters associated with its TCCs in any manner it chooses, within the constraints of an acquirer controls API 32.

With continued reference to FIG. 3, the acquirer server 10 may set the TCC using the acquirer application 30, and this TCC may be communicated (e.g., via an API call) to the transaction service provider request processor 26, which communicates with the acquirer controls API 32. The acquirer controls API 32 may be managed by or on behalf of the transaction service provider. The acquirer controls API 32 may be a representational State Transfer (REST) API, and the acquirer controls API 32 may communicate the TCC set by the acquirer server 10 to the controls database 22 for storage.

With continued reference to FIG. 3, the transaction service provider request processor 26 may communicate with the controls database 22 (via the acquirer controls API 32) to receive data from the controls database 22 corresponding to the TCC and the parameters associated with the TCC. The transaction service provider request processor 26 may also communicate (via the acquirer controls API 32) data to the controls database 22 for storage. The data received by the transaction service provider request processor 26 from the controls database 22 may be used by the transaction service provider request processor 26 to determine whether the transaction message received by the transaction service provider request processor 26 from the merchant application 24 should be approved or blocked. In some non-limiting embodiments or aspects, the transaction service provider request processor 26 may analyze the parameter (or incremented parameter) from the transaction message with respect to the TCC (e.g., comparing the parameter or the incremented parameter with the TCC).

With continued reference to FIG. 3, the transaction service provider request processor 26 may analyze the parameter from the transaction message received from the merchant application 24 with respect to the TCC received from the controls database 22 (via the acquirer controls API 32). If the transaction service provider request processor 26 determines that the TCC is not satisfied, the transaction service provider request processor 26 may communicate with a transaction service provider transaction processor 28. The transaction service provider transaction processor 28 may generate a processing request message to be communicated to the issuer server 18. Based on this processing request message, the issuer server 18 may further process the transaction. The transaction service provider request processor 26 may communicate a message to the merchant application 24 to indicate to the merchant system 16 that the transaction associated with the transaction message is approved. The transaction service provider request processor 26 may communicate with the controls database 22 (via the acquirer controls API 32) to store information corresponding to the approved transaction message. The transaction service provider request processor 26 may communicate a message to the acquirer server 10 via the acquirer application 30 to indicate that the transaction associated with the transaction is approved. The transaction service provider request processor 26 may also generate the update data associated with the at least one parameter. The transaction service provider request processor 26 may generate and communicate an update message (e.g., a notification) to the acquirer server 10 via the acquirer application 30 or the merchant system 16 via the merchant application 24 that includes at least a portion of the update data. It will be appreciated that a notification corresponding to the analysis of the parameter of the transaction message with respect to the TCC may be communicated by the transaction service provider request processor 26 to any entity, including, but not limited to: the requesting processor of the merchant system 16, the acquirer server 10, a server, a third-party server, or any combination thereof.

If the transaction service provider request processor 26 determines that the TCC is satisfied, the transaction service provider request processor 26 may generate a rejection message associated with the transaction request, and this rejection message may be communicated to the merchant application 24. This rejection message may indicate to the merchant system 16 that the transaction associated with the transaction message is blocked and/or that the TCC has been satisfied. The transaction service provider request processor 26 may also generate and communicate a message to the acquirer server 10 via the acquirer application 30 to notify the acquirer server 10 that the transaction of the merchant system 16 was blocked and that the TCC has been satisfied. It will be appreciated that a notification corresponding to the analysis of the parameter of the transaction message with respect to the TCC may be communicated by the transaction service provider request processor 26 to any entity, including, but not limited to: the requesting processor of the merchant system 16, the acquirer server 10, a server, a third-party server, or any combination thereof.

Referring back to FIGS. 2 and 3, the systems 200, 300 may differ by the arrangement in which the acquirer server 10 sets and/or communicates acquirer controls (e.g., the TCCs) to the transaction processing server 12. In the system 200 shown in FIG. 2, the acquirer server 10 may set and/or communicate acquirer controls using the UI 20, which may communicate with the transaction service provider request processor 26, and the U 120 may be managed by or on behalf of the transaction service provider. In the system 300 shown in FIG. 3, the acquirer server 10 may set and/or communicate acquirer controls using the acquirer application 30, which may communicate with the transaction service provider request processor 26 by making an API call to the transaction service provider request processor 26. The acquirer application 30 may be managed by or on behalf of the acquirer server 10.

Figure 4:
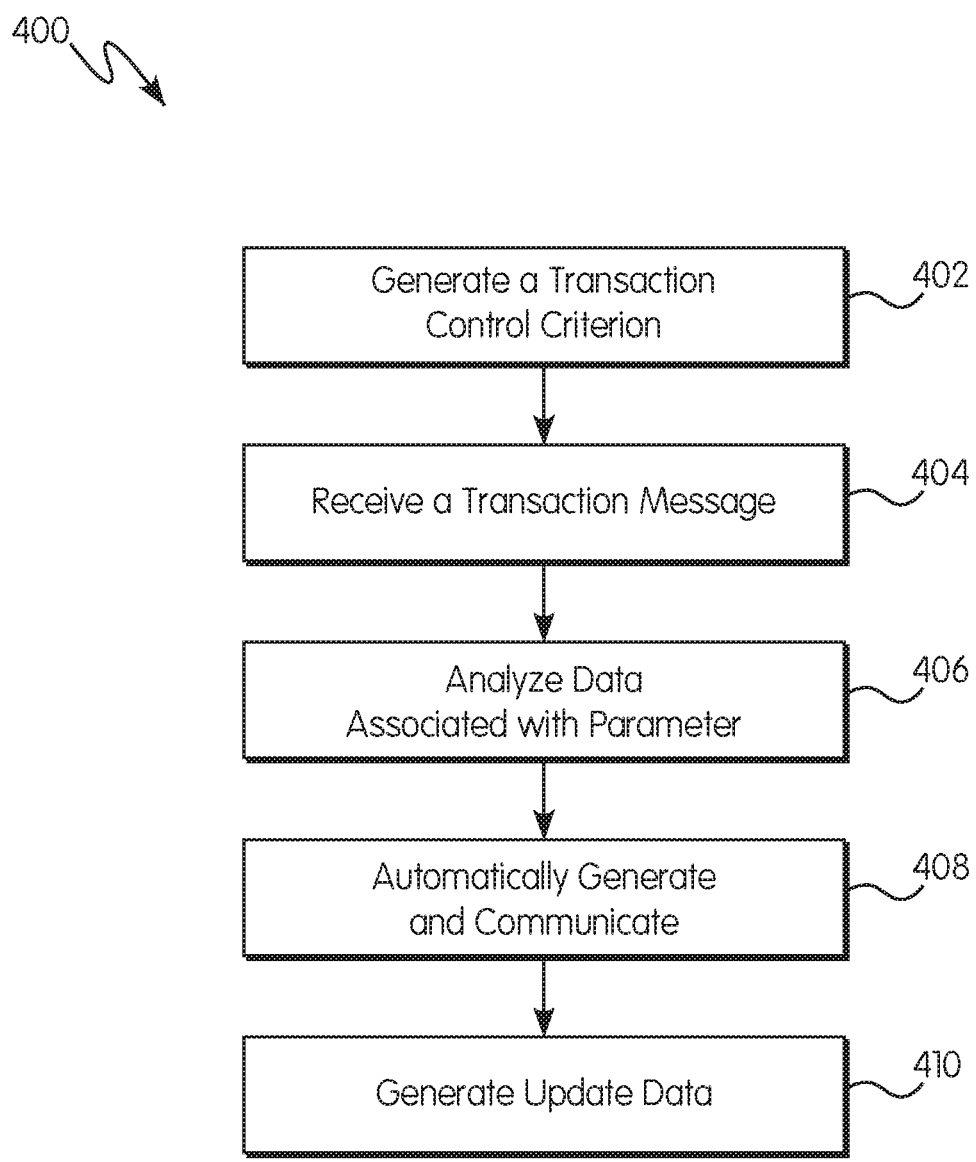
FIG. 4 is a step diagram of a non-limiting embodiment or aspect of a method of controlling transaction velocity limits according to principles of the present disclosure.

Referring to FIG. 4, a method 400 of controlling transaction velocity limits is shown. At a step 402, at least one processor may generate at least one TCC associated with the at least one parameter. The acquirer server 10 may set the TCC, which is communicated to the transaction processing server 12. The transaction processing server 12 may then generate the TCC associated with the parameter(s) based on the settings from the acquirer server 10. The parameters may be any of the previously-described parameters upon which the TCC may be based. The acquirer server 10 may set, and the transaction processing server 12 may generate the TCC using any of the example systems (e.g., system 100, system 200, and system 300) described above, or any other system consistent with the present disclosure.

With continued reference to FIG. 4, at a step 404, at least one processor may receive the transaction message associated with a transaction request. The transaction request may include data associated with the at least one parameter. The merchant system 16 may communicate the transaction request to the transaction processing server 12, and the parameter in the transaction request may correspond to the parameter upon which the TCC is based. The transaction processing server 12 may receive the transaction message from the merchant system 16 as described in any of the above example systems (e.g., system 100, system 200, and system 300), or any other system consistent with the present disclosure.

With continued reference to FIG. 4, at a step 406, at least one processor may analyze at least a portion of the data associated with the at least one parameter with respect to the at least one TCC associated with the at least one parameter. This analysis may determine whether the transaction associated with the transaction message is approved or blocked, and this analysis may be performed by the transaction processing server 12 as described in any of the above example systems (e.g., system 100, system 200, and system 300), or any other system consistent with the present disclosure.

With continued reference to FIG. 4, at a step 408, at least one processor may generate and communicate at least one of: a processing request message associated with the transaction request if data associated with the at least one parameter in the transaction message does not satisfy the transaction control criterion associated with the at least one parameter; and a rejection response message if data associated with the at least one parameter in the transaction message does satisfy the transaction control criterion associated with the at least one parameter. These messages may be generated and communicated by the transaction processing server 12 as described in any of the above example systems (e.g., system 100, system 200, and system 300), or any other system consistent with the present disclosure. The transaction processing server 12 may also generate and communicate any other message in connection with the results of the analysis as described in any of the above example systems (e.g., system 100, system 200, and system 300), or any other system consistent with the present disclosure.

With continued reference to FIG. 4, at a step 410, at least one processor may generate the update data associated with the at least one parameter. The transaction processing server 12 may generate the update as described in any of the above example systems (e.g., system 100, system 200, and system 300), or any other system consistent with the present disclosure.

In a further, non-limiting embodiment or aspect, a computer program product for controlling transaction velocity limits includes at least one non-transitory computer readable medium including program instructions that, when executed by at least one processor, cause the at least one processor to execute one of the previously-described methods (e.g., method 400). The at least one processor may include the transaction service provider request processor 26, transaction service provider transaction processor 28, and/or other processor.

The computer program product may include a plurality of computer-readable media, such as a first computer-readable medium and a second computer-readable medium. The first computer-readable medium may be located at a transaction service provider. The second computer-readable medium may be located remote from the transaction service provider, such as at the acquirer.

The following example is provided to illustrate an exemplary embodiment of the system, method, and computer program product for controlling transaction velocity limits, and is not meant to be limiting.

Figure 5:
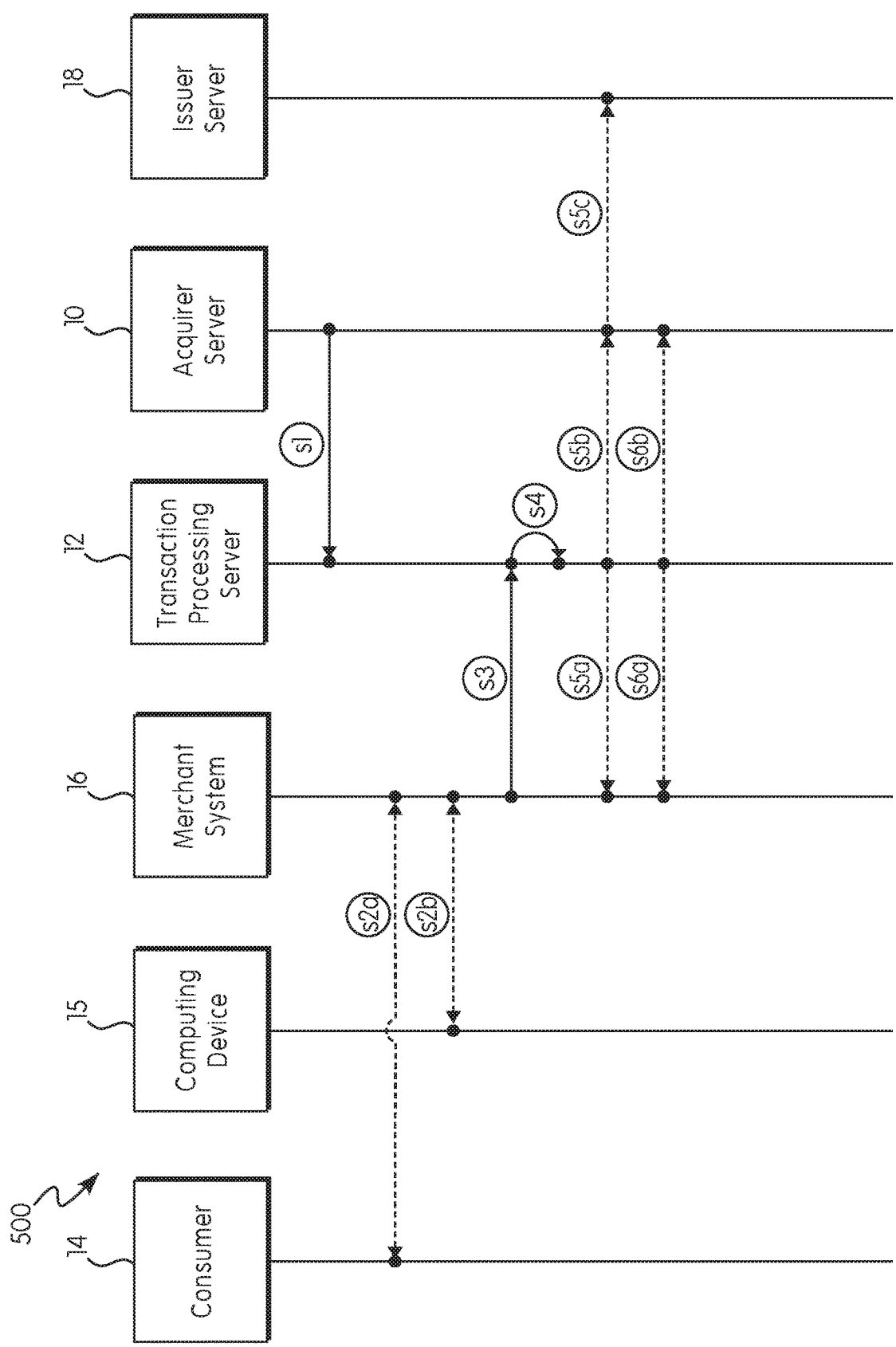
FIG. 5 is a process flow diagram of a non-limiting embodiment or aspect of another method of controlling transaction velocity limits according to principles of the present disclosure.

Referring to FIG. 5, a non-limiting example of a method 500 of controlling transaction velocity limits is shown. In this example, the consumer 14 (e.g., Jane Smith) is an individual and portable financial device holder; the merchant system 16 (e.g., John's Airport Cafe POS device) is a system operated by or on behalf of John's Airport Cafe, which is a small business restaurant; the transaction processing server 12 (e.g., First Credit Card Company Server) is a server of First Credit Card Company, which is a major credit card company; the acquirer server 10 (e.g., First Acquirer Bank Server) is a server of First Acquirer Bank, which is a merchant bank sponsoring or affiliated with John's Airport Cafe and authorized to sponsor John's Airport Cafe by First Credit Card Company Server; and the issuer server 18 (e.g., First Issuer Bank Server) is a server of a First Issuer Bank, which is a major bank issuing credit and/or debit cards to individuals.

With continued reference to FIG. 5, at a first step (s1), First Acquirer Bank Server communicates a TCC to First Credit Card Company Server, and the TCC is a velocity control (e.g., a limit) corresponding to John's Airport Cafe POS device. The TCC is associated with at least one of the previously-described parameters. The TCC set by the First Acquirer Bank Server and communicated to First Credit Card Company imposes at least one TCC on John's Airport Cafe POS device, such as: a $500 limit for each transaction processed by John's Airport Cafe POS device, a $10,000 limit on the amount of transactions processed by John's Airport Cafe POS device in a day, a 300 transaction limit on the number of transactions processed by John's Airport Cafe POS device in a day, a 50 transaction limit on the number of transactions processed within any hour of any day by John's Airport Cafe POS device, a block of any transactions being processed by John's Airport Cafe POS device during the diner's closed hours, a block of any transactions being processed by John's Airport Cafe POS device that are not credit card transactions, a block of any transactions being processed by John's Airport Cafe POS device for any credit card not issued by First Issuer Bank, a block of any transactions being processed by John's Airport Cafe POS device having a base currency of anything other than the US dollar, a $5,000 limit on transactions being by John's Airport Cafe POS device having a base currency of British Pounds, a block of any transactions being processed by John's Airport Cafe POS device after the acquirer server has activated the terminate/stop switch limit. More than one TCC may be set by First Acquirer Bank Server (e.g., some combination of the above described TCCs). It will be appreciated that First Acquirer Bank Server sets velocity controls corresponding to John's Airport Cafe POS device based on any other determinable parameter associated with the transactions of John's Airport Cafe POS Device. First Acquirer Bank Server sets and communicates the TCC(s) to First Credit Card Company Server, and First Credit Card Company server generates the TCC(s) to monitor and/or control velocity limits.

It will be appreciated that First Acquirer Bank Server sets the TCC based on historical data or knowledge associated with John's Airport Cafe POS device. For example, First Acquirer Bank Server knows or expects from historical data that typical transactions for small business restaurants (like John's Airport Cafe) rarely exceed $500 for a single transaction and sets a suitable TCC associated with an amount limit for each of John's Airport Cafe POS device transactions at $500. In another Example, First Acquirer Bank Server knows or expects from historical data that John's Airport Cafe POS device typically handles up to 150 transactions on each of Monday-Thursday and up to 300 transactions each of Friday-Sunday, and sets a limit on the number of daily transactions permitted by John's Airport Cafe POS device accordingly. First Acquirer Bank Server knows or expects from historical data that businesses, such as John's Airport Cafe, conduct increased business on high-travel time periods or days around the holidays, and adjusts the typical TCCs for John's Airport Cafe POS device on those days accordingly.

First Acquirer Bank Server communicates new TCCs to replace in-force TCCs to First Credit Card Company Server at any time. Further, First Acquirer Bank Server sets different TCCs for different merchant systems with which it is associated. For example, a merchant system 16 (e.g., Merchant B POS device), owned by or on behalf of Merchant B, where Merchant B is a big chain restaurant, small business selling other goods, or a big box store, requires a different set of TCCs. These TCCs set by First Acquirer Bank Server reduce liability of at least the acquirer and/or the merchant from potential fraudulent activity by instituting velocity controls based on expected and/or typical transaction activity conducted by the various merchant systems.

With continued reference to FIG. 5, at a second step (s2a, s2b), Jane Smith and/or a computing device 15 of Jane Smith (e.g., Jane Smith's smartphone) and/or John's Airport Cafe POS device initiates a transactions. According to this example, Jane Smith is a diner at John's Airport Cafe. Jane Smith initiates the transaction with John's Airport Cafe POS device by presenting the personal financial device issued by First Issuer Bank (s2a). Jane Smith initiates the transaction with John's Airport Cafe POS device using her smartphone (s2b). In exchange, John's Airport Cafe provides Jane Smith with the meal that was ordered. It will be appreciated that any exchange of goods and/or services or promise of exchange of future goods and/or services occurs at this second step (s2a, s2b).

With continued reference to FIG. 5, at a third step (s3), John's Airport Cafe POS device communicates a transaction message associated with the transaction between Jane Smith and John's Airport Cafe POS device to First Credit Card Company Server. The transaction message is communicated from a requesting processor of John's Airport Cafe POS device (e.g., from a merchant application running on a processor) to First Credit Card Company Server. The transaction message includes data associated with the parameter upon which the TCC is based.

With continued reference to FIG. 5, at a fourth step (s4), First Credit Card Company Server analyzes at least a portion of the data contained in the transaction message. The data includes the parameter upon which the TCC is based. This parameter is analyzed with respect to the TCC associated with that parameter. In some non-limiting embodiments or aspects, the parameter in the transaction message is directly compared to the TCC, such as in cases in which the TCC is not based on a sum of a parameter over a period of time. For instance, if the TCC is a limit on the amount of a single transaction (e.g., $500/transaction limit), the data from the transaction message that includes the amount of the transaction may be compared to the TCC limit directly to see if the TCC has been satisfied. However, in some non-limiting embodiments or aspects, First Credit Card Company Server needs to first translate (e.g., incrementing) the parameter associated with the TCC contained in the transaction message before that parameter can be analyzed with respect to the TCC. For example, in a case in which the TCC is the sum of all transactions from John's Airport Cafe POS device over the course of a day (e.g., $100,000/day limit), the transaction message includes the amount of the transaction associated with the transaction message. Thus, First Credit Card Company Server sums the amounts of all of the transactions conducted by John's Airport Cafe POS device that day (including the amount from the present transaction message) (e.g., incremented data), and First Credit Card Company Server analyzes this incremented data with respect to the TCC to see if the TCC has been satisfied.

With continued reference to FIG. 5, at a fifth step (s5a-s5c), First Credit Card Company Server generates and/or communicates at least one message and/or response. This message and/or response is based on the analysis from the previous step (s4). If the analysis concludes that the TCC has not been satisfied by the transaction contained in the transaction message, First Credit Card Company Server generates and/or communicates a response to John's Airport Cafe POS device to indicate that the transaction is approved (s5a). First Credit Card Company Server generates and/or transmits a communication to First Acquirer Bank Server to indicate that the transaction of John's Airport Cafe POS device is approved (s5b). First Credit Card Company Server generates and/or communicates a processing request message to the First Issuer Bank Server to request that First Issuer Bank Server proceed with processing the transaction (s5c). If the analysis concludes that the TCC has been satisfied by the transaction contained in the transaction message, First Credit Card Company Server generates and/or communicates a response to John's Airport Cafe POS device to indicate that the transaction is blocked and/or that the TCC has been satisfied (s5a). First Credit Card Company Server generates and/or communicates a communication to First Acquirer Bank Server to indicate that the transaction of John's Airport Cafe POS device is blocked and/or that the TCC has been satisfied (s5b).

With continued reference to FIG. 5, at a sixth step (s6a, s6b), First Credit Card Company Server generates update data associated with at least one parameter. Based on the most recent transaction message from John's Airport Cafe POS device, First Credit Card Company Server updates data associated with various parameters that are the basis of a TCC. For instance, First Credit Card Company Server increments the amount of number of transactions over the course of a day so that an updated value for those parameters is generated. The update data associated with parameters not associated with values (e.g., card type) is compiled. For instance, First Credit Card Company Server analyzes statistics that indicate how frequently a credit card is used with John's Airport Cafe POS device. This update data is generated and communicated to John's Airport Cafe POS device (s6a) so that it can monitor the parameter that may be the basis of the TCC. This update data is generated and communicated to First Acquirer Bank Server (s6b) so that it can monitor the parameter that may be the basis of the TCC. In some non-limiting embodiments or aspects, these communications are sent after each transaction message. In other non-limiting embodiments or aspects, these communications are sent after a certain threshold (e.g., a percentage of the TCC) has been reached, such as 75% of the TCC has been satisfied. In some non-limiting embodiments or aspects, John's Airport Cafe POS device and/or First Acquirer Bank Server communicate with First Credit Card Company Server to request this information related to the parameters that may be the basis of the TCC, such that John's Airport Cafe POS device and/or First Acquirer Bank Server actively monitor the relevant parameters. In some non-limiting embodiments or aspects, this communication is an API call to request the information.

Referring to FIGS. 6A-6D, an interface 39 by which First Acquirer Bank Server sets and communicates a transaction control criterion according to a non-limiting embodiment or aspect of the disclosure is shown. The interface 39 may be any means by which First Acquirer Bank Server sets and communicates the TCCs for merchant A system to First Credit Card Company Server. The interface 39 may be the previously described UI 20 or acquirer application 30. The interface 39 is not limited to the embodiment illustrated in FIGS. 6A-6D. The interface 39 may be managed, owned, controlled, and/or designed by First Credit Card Company (e.g., available on a website owned and/or controlled by or on behalf of First Credit Card Company). The interface 39 may be managed, owned, controlled, and/or designed by First Acquirer Bank (e.g., available on an application of First Acquirer Bank) so that First Acquirer Bank design a system that best allows First Acquirer Bank Server to make an API call to First Credit Card Company Server to set a TCC and/or request the update data.

Referring to FIG. 6A, the interface 39 may include a merchant list 40. The merchant list 40 may be a dropdown box to allow First Acquirer Bank Server to select the merchant system for which the TCC is being set. The merchant list 40 need not be a dropdown box but may be any other suitable interface for the First Acquirer Bank Server to select or enter the desired merchant system 16. In the Example shown in FIG. 6A, First Acquirer Bank Server may select at least one merchant system 16 from Merchants A-J.

Referring to FIG. 6B, the interface 39 may include a BIN list 42. The BIN list 42 may be a dropdown box to allow First Acquirer Bank Server to select the bank identification number (BIN) that the merchant system 16 uses to submit transactions so that the TCC is being set for the correct BIN. The BIN list 42 need not be a dropdown box but may be any other suitable interface for the First Acquirer Bank Server to select or enter the desired BIN. In the Example shown in FIG. 6B, First Acquirer Bank Server may select at least one of BIN "123456" and "654321".

Referring to FIG. 6C, the interface 39 may include an amount limit 44. The amount limit 44 may be an open field (e.g., a text box) into which First Acquirer Bank Server enters a maximum monetary amount of transactions permitted by merchant A system over the period of time (e.g., a day). The amount limit 44 need not be an open field but may be any other suitable interface for the First Acquirer Bank Server to select or enter the desired amount. The amount limit 44 may also include the ability for First Acquirer Bank Server to specify the currency of the amount (e.g., US dollars). In the example in FIG. 6C, the amount limit 44 is ten million US dollars per day for merchant A system. The interface 39 may also include a count limit 46. The count limit 46 may be an open field into which First Acquirer Bank Server enters the maximum number of transactions permitted by merchant A system over the period of time (e.g., a day). The count limit 46 need not be an open field but may be any other suitable interface for the First Acquirer Bank Server to select or enter the count limit. In the example in FIG. 6C, the count limit 46 is 500,000 transactions per day for merchant A system.

Referring to FIG. 6D, the interface 39 may include a notification threshold 48. The notification threshold 48 may be an open field into which First Acquirer Bank Server enters a threshold at which point a notification will be sent to merchant A system (or other processor of merchant A) or other entity (e.g., First Acquirer Bank Server). The notification threshold 48 need not be an open field but may be any other suitable interface for the First Acquirer Bank Server to select or enter the threshold. The notification threshold 48 may be an amount, percent, count, or any other threshold that is able to be triggered with respect to the parameters. In the example in FIG. 6D, the notification threshold 48 is 55% of the TCC. The interface 39 may also include a notification address 50. The notification address 50 may be an open field into which First Acquirer Bank Server enters contact information for the notification to be sent. The contact information may be, for example, an email address, mailing address, and/or phone number. More than one notification address 50 may be entered. The notification address 50 need not be an open field but may be any other suitable interface for the First Acquirer Bank Server to select or enter the contact information. In the example in FIG. 6D, the notification address 50 is merchantA@biz.com. The contact information of any entity (e.g., First Acquirer Bank Server or merchant A system) may be entered into the notification address 50. Therefore, according the example in 6D, a notification will be sent to an email address of Merchant A (merchantA@biz.com) after 55% of the TCC is reached.

It will be appreciated that the interface 39 may include the ability to control other parameters associated with transactions, such as any of the parameters previously discussed.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method of controlling transaction velocity limits, comprising:
   (a) generating or causing the generation of an application programming interface (API) programmed and/or configured to receive an API call from an acquirer system, the API call comprising at least one transaction control criterion for a merchant and a notification threshold, wherein the at least one transaction control criterion comprises at least one parameter comprising a maximum value over a predetermined time, wherein the notification threshold corresponds to a percentage of the maximum value;
   (b) in response to receiving the API call, generating, with at least one processor, the at least one transaction control criterion associated with the merchant;
   during a first time period having a duration of the predetermined time:
   (c) receiving, from at least one requesting processor, a first transaction message associated with a first transaction request associated with the merchant, the first transaction message comprising data comprising a first value associated with the at least one parameter;
   (d) based on the first value, generating, with at least one processor, a first incremented value associated with the at least one parameter over the first time period;
   (e) comparing, with at least one processor, the first incremented value with the maximum value to determine whether the at least one transaction control criterion has been satisfied;
   (f) determining, with at least one processor, that the at least one transaction control criterion has not been satisfied based on comparing the first incremented value with the maximum value;
   (g) automatically generating and communicating, with at least one processor, a processing request message associated with the first transaction request in response to determining that the at least one transaction control criterion has not been satisfied;
   (h) determining, with at least one processor, that the first incremented value exceeds the notification threshold and generating a notification;
   (i) transmitting, with at least one processor, the notification to the acquirer system and/or a merchant system;
   (j) in response to the acquirer system and/or the merchant system determining that a plurality of transaction requests received during the first time period are non-fraudulent, receiving a modification to the at least one transaction control criterion for the first time period, wherein the modification comprises an increase to the maximum value to be used for the first time period;
   (k) receiving, from the at least one requesting processor, a second transaction message associated with a second transaction request associated with the merchant, the second transaction message comprising data comprising a second value associated with the at least one parameter;
   (l) based on the second value, generating, with at least one processor, a second incremented value associated with the at least one parameter over the first time period; and
   (m) comparing, with at least one processor, the second incremented value with the increased maximum value to determine whether the modification to the at least one transaction control criterion for the first time period has been satisfied.

2. The method of claim 1, further comprising repeating steps (c)-(e) for a subsequent transaction message from the at least one requesting processor.

3. The method of claim 1, further comprising preventing the processing of any further transactions for the merchant by or through the at least one requesting processor based at least partially on subsequent data associated with the at least one parameter.

4. The method of claim 1, wherein the notification comprises the first incremented value.

5. The method of claim 1, wherein the at least one parameter comprises at least one of the following: sum of monetary transactions amount over the predetermined time and/or transaction count over the predetermined time.

6. A system for controlling transaction velocity limits, comprising at least one server computer including at least one processor, the at least one server computer programmed and/or configured to:
   (a) generate or cause the generation of an application programming interface (API) programmed and/or configured to receive an API call from an acquirer system, the API call comprising at least one transaction control criterion for a merchant and a notification threshold, wherein the at least one transaction control criterion comprises at least one parameter comprising a maximum value over a predetermined time, wherein the notification threshold corresponds to a percentage of the maximum value;
   (b) in response to receiving the API call, generate the at least one transaction control criterion associated with the merchant;
   during a first time period having a duration of the predetermined time:
   (c) receive a first transaction message associated with a first transaction request associated with the merchant, the first transaction message comprising data comprising a first value associated with the at least one parameter;
   (d) based on the first value, generate a first incremented value associated with the at least one parameter over the first time period;
   (e) compare the first incremented value with the maximum value to determine whether the at least one transaction control criterion has been satisfied;
   (f) determine that the at least one transaction control criterion has not been satisfied based on comparing the first incremented value with the maximum value;
   (g) automatically generate and communicate a processing request message associated with the first transaction request in response to determining that the at least one transaction control criterion has not been satisfied;
   (h) determine that the first incremented value exceeds the notification threshold and generate a notification;
   (i) transmit the notification to the acquirer system and/or a merchant system;

(j) in response to the acquirer system and/or the merchant system determining that a plurality of transaction requests received during the first time period are non-fraudulent, receive a modification to the at least one transaction control criterion for the first time period, wherein the modification comprises an increase to the maximum value to be used for the first time period;

(k) receive, from the at least one requesting processor, a second transaction message associated with a second transaction request associated with the merchant, the second transaction message comprising data comprising a second value associated with the at least one parameter;

(l) based on the second value, generate a second incremented value associated with the at least one parameter over the first time period; and (m) compare the second incremented value with the increased maximum value to determine whether the modification to the at least one transaction control criterion for the first time period has been satisfied.

7. The system of claim 6, programmed and/or configured to repeat (c)-(e) for a subsequent transaction message from the at least one requesting processor.

8. The system of claim 6, further programmed and/or configured to prevent the processing of any further transactions for the merchant by or through the at least one requesting processor based at least partially on subsequent data associated with the at least one parameter.

9. The system of claim 6, wherein the notification comprises the first incremented value.

10. The system of claim 6, wherein the at least one parameter comprises at least one of the following: sum of monetary transactions amount over the predetermined time and/or transaction count over the predetermined time.

11. A computer program product for controlling transaction velocity limits, comprising at least one non-transitory computer-readable medium including program instructions that, when executed by at least one processor, cause the at least one processor to:

(a) generate or cause the generation of an application programming interface (API) programmed and/or configured to receive an API call from an acquirer system, the API call comprising at least one transaction control criterion for a merchant and a notification threshold, wherein the at least one transaction control criterion comprises at least one parameter comprising a maximum value over a predetermined time, wherein the notification threshold corresponds to a percentage of the maximum value;

(b) in response to receiving the API call, generate the at least one transaction control criterion associated with the merchant;

during a first time period having a duration of the predetermined time:

(c) receive a first transaction message associated with a first transaction request associated with the merchant, the first transaction message comprising data comprising a first value associated with the at least one parameter;

(d) based on the first value, generate a first incremented value associated with the at least one parameter over the first time period;

(e) compare the first incremented value with the maximum value to determine whether the at least one transaction control criterion has been satisfied;

(f) determine that the at least one transaction control criterion has not been satisfied based on comparing the first incremented value with the maximum value;

(g) automatically generate and communicate a processing request message associated with the first transaction request in response to determining that the at least one transaction control criterion has not been satisfied;

(h) determine that the first incremented value exceeds the notification threshold and generate a notification;

(i) transmit the notification to the acquirer system and/or a merchant system;

(j) in response to the acquirer system and/or the merchant system determining that a plurality of transaction requests received during the first time period are non-fraudulent, receive a modification to the at least one transaction control criterion for the first time period, wherein the modification comprises an increase to the maximum value to be used for the first time period;

(k) receive, from the at least one requesting processor, a second transaction message associated with a second transaction request associated with the merchant, the second transaction message comprising data comprising a second value associated with the at least one parameter;

(l) based on the second value, generate a second incremented value associated with the at least one parameter over the first time period; and (m) compare the second incremented value with the increased maximum value to determine whether the modification to the at least one transaction control criterion for the first time period has been satisfied.

* * * * *